US012609952B2

(12) United States Patent
Sethi et al.

(10) Patent No.: US 12,609,952 B2
(45) Date of Patent: Apr. 21, 2026

(54) NETWORK PROTOCOL SECURITY FRAMEWORK TO PREVENT CYBERATTACK ON A COMPUTING ENVIRONMENT

(71) Applicant: Dell Products L.P., Round Rock, TX (US)

(72) Inventors: Parminder Singh Sethi, Ludhiana (IN); Anay Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 18/492,226

(22) Filed: Oct. 23, 2023

(65) Prior Publication Data

US 2025/0133098 A1 Apr. 24, 2025

(51) Int. Cl.
H04L 9/40 (2022.01)

(52) U.S. Cl.
CPC ...... H04L 63/1425 (2013.01); H04L 63/1458 (2013.01); H04L 63/166 (2013.01)

(58) Field of Classification Search
CPC ............. H04L 63/1425; H04L 63/1458; H04L 63/166
See application file for complete search history.

(56) References Cited

U.S. PATENT DOCUMENTS

| | | | | |
|---|---|---|---|---|
| 10,708,393 | B1 * | 7/2020 | Thornewell | ........... H04L 47/323 |
| 12,149,626 | B1 * | 11/2024 | Filsfils | ................ H04L 63/0209 |
| 12,401,629 | B2 * | 8/2025 | Crabtree | ............... H04L 9/3239 |
| 12,401,685 | B2 * | 8/2025 | Agarwal | ............. H04L 63/1458 |
| 2011/0238855 | A1 * | 9/2011 | Korsunsky | .......... H04L 63/1441 |
| | | | | 709/231 |
| 2020/0228538 | A1 * | 7/2020 | Soule | .................... H04L 63/105 |
| 2022/0078205 | A1 * | 3/2022 | Bjarnason | ........... H04L 63/1425 |
| 2024/0385985 | A1 * | 11/2024 | Lindow | ............... H04L 12/4641 |
| 2025/0030544 | A1 * | 1/2025 | Sidman | .................... H04L 9/12 |
| 2025/0037008 | A1 * | 1/2025 | Mara | ........................ G06F 16/20 |
| 2025/0039143 | A1 * | 1/2025 | Parla | ....................... H04L 63/20 |
| 2025/0039196 | A1 * | 1/2025 | Crabtree | ............ G06F 21/6218 |
| 2025/0039239 | A1 * | 1/2025 | Parla | ................... H04L 63/1425 |
| 2025/0053674 | A1 * | 2/2025 | Arriaga | .............. G06F 21/6218 |
| 2025/0071142 | A1 * | 2/2025 | Sethi | ................... H04L 63/1458 |
| 2025/0080495 | A1 * | 3/2025 | Tian | .................... H04L 63/0281 |

(Continued)

OTHER PUBLICATIONS

Sensu Docs, "TCP Stream Handlers Reference," https://docs.sensu.io/sensu-go/latest/observability-pipeline/observe-process/tcp-stream-handlers/#:~: text=TCP, Accessed Oct. 5, 2023, 12 pages.

(Continued)

*Primary Examiner* — Stephen T Gundry
(74) *Attorney, Agent, or Firm* — Ryan, Mason & Lewis, LLP

(57) ABSTRACT

A method comprises configuring a network protocol security engine to separately reside between a set of one or more first computing devices (e.g., clients) making one or more service requests (e.g., TCP requests) and a set of one or more second computing devices (e.g., web servers) responding to the one or more service requests. The network protocol security engine validates packets associated with the requests/responses to either accept or reject the requests/responses and thus prevent cyberattacks (e.g., flooding attacks) from adversely affecting resources of the set of one or more second computing devices.

20 Claims, 8 Drawing Sheets

100

(56) References Cited

U.S. PATENT DOCUMENTS

| | | | | |
|---|---|---|---|---|
| 2025/0112891 | A1* | 4/2025 | Pierrepont | H04L 63/029 |
| 2025/0126142 | A1* | 4/2025 | Sethi | H04L 63/0281 |
| 2025/0133098 | A1* | 4/2025 | Sethi | H04L 63/1458 |
| 2025/0158925 | A1* | 5/2025 | Lynn, Jr. | H04L 41/0654 |
| 2025/0184309 | A1* | 6/2025 | Kommula | G06N 5/022 |
| 2025/0211575 | A1* | 6/2025 | Kommula | G06N 5/022 |

OTHER PUBLICATIONS

Cloudflare, "What is a DDoS Attack?" https://www.cloudflare.com/learning/ddos/what-is-a-ddos-attack/, Accessed Oct. 31, 2019, 19 pages.

M. Duo, "IPv4 vs IPV6—What's The Difference Between the Two Protocols?" https://kinsta.com/blog/ipv4-vs-ipv6/, Dec. 5, 2022, 15 pages.

J. Le, "The 4-Layer Internet Model Network Engineers Need to Know," https://le-james94.medium.com/the-4-layer-internet-model-network-engineers-need-to-know-e78432614a4f, Dec. 21, 2017, 21 pages.

Alienor, "The Network Layers Explained [with examples]" https://www.plixer.com/blog/network-layers-explained/, Nov. 28, 2018, 18 pages.

Wikipedia, "Transmission Control Protocol," https://en.wikipedia.org/wiki/Transmission_Control_Protocol, Oct. 14, 2023, 23 pages.

Wikipedia, "OSI Model," https://en.wikipedia.org/wiki/OSI_model, Oct. 22, 2023, 8 pages.

* cited by examiner 131867.01

600

602   CONFIGURE NETWORK PROTOCOL SECURITY ENGINE TO SEPARATELY RESIDE BETWEEN A SET OF ONE OR MORE FIRST COMPUTING DEVICES (E.G., CLIENTS) MAKING ONE OR MORE SERVICE REQUESTS AND A SET OF ONE OR MORE SECOND COMPUTING DEVICES (E.G., WEB SERVERS) RESPONDING TO THE ONE OR MORE SERVICE REQUESTS

604   OBTAIN, AT NETWORK PROTOCOL SECURITY ENGINE, AT LEAST ONE PACKET, WHEREIN THE AT LEAST ONE PACKET IS ASSOCIATED WITH A NETWORK PROTOCOL LAYER REQUEST RECEIVED FROM ONE OF THE SET OF ONE OR MORE FIRST COMPUTING DEVICES, OR ASSOCIATED WITH A NETWORK PROTOCOL LAYER RESPONSE FROM ONE OF THE SET OF ONE OR MORE SECOND COMPUTING DEVICES

606   PERFORM, AT NETWORK PROTOCOL SECURITY ENGINE, ONE OR MORE VALIDATIONS ON ONE OR MORE ATTRIBUTES OF THE AT LEAST ONE PACKET

608   AT NETWORK PROTOCOL SECURITY ENGINE, ACCEPT THE REQUEST OR THE RESPONSE, OR REJECT THE REQUEST OR THE RESPONSE, BASED ON RESULTS OF THE ONE OR MORE VALIDATIONS ON THE ONE OR MORE ATTRIBUTES OF THE AT LEAST ONE PACKET

FIG. 6

NETWORK PROTOCOL SECURITY FRAMEWORK TO PREVENT CYBERATTACK ON A COMPUTING ENVIRONMENT

FIELD

The field relates generally to information processing systems, and more particularly to techniques for network protocol security in such information processing systems.

BACKGROUND

The Transmission Control Protocol (TCP) is one of the most important protocols in the networking protocol stack of a communication network. TCP operates in the transport layer, defined as the fourth layer in the Open Systems Interconnection model from the International Organization for Standardization (ISO/OSI reference model) and the third layer in the Transmission Control Protocol/Internet Protocol (TCP/IP) reference model. TCP has always been one of the prime targets for malicious actors (e.g., systems, devices, programs, etc.) as the impact of a failure on this layer, caused by a cyberattack, can be detrimental to a datacenter or any computing environment.

One method of cyberattack by such malicious actors is known as a Distributed Denial of Service (DDOS) attack. A DDOS attack can be triggered in many ways. By way of example, some methods include: (i) triggering multiple SYN requests from one or more sources (SYN is short for synchronize and is a TCP packet sent from one computing device to another computing device requesting that a connection be established therebetween); (ii) deploying bots in different hosts (i.e., bot army) and launching a coordinated attack on a target to overwhelm the system; (iii) triggering RST packets to reset and disrupt valid connections (RST is short for reset and is a TCP message that forcefully terminates the connection between two computing devices); (iii) triggering FIN packets to terminate valid connections (FIN is short for finish and is a TCP message that triggers a graceful connection termination between two computing devices); (iv) launching a large number of ACK packets to a target (ACK is short for acknowledge and is a TCP message sent by one computing device when it receives a SYN request form another computing device); and (v) launching a large number of malformed data packets with wrong values to confuse the system.

It is realized that protecting against the above and other attacks on a communication network, particularly on the network protocol layer comprising TCP, presents significant technical challenges.

SUMMARY

Illustrative embodiments provide techniques for network protocol security in information processing systems.

For example, in one or more illustrative embodiments, a method comprises configuring a network protocol security engine to separately reside between a set of one or more first computing devices making one or more service requests and a set of one or more second computing devices responding to the one or more service requests. The method further comprises obtaining, at the network protocol security engine, at least one packet, wherein the at least one packet is associated with a network protocol layer request received from one of the set of one or more first computing devices, or associated with a network protocol layer response from one of the set of one or more second computing devices. The method further comprises performing, at the network protocol security engine, one or more validations on one or more attributes of the at least one packet. The method further comprises, at the network protocol security engine, accepting the request or the response, or rejecting the request or the response, based on results of the one or more validations on the one or more attributes of the at least one packet.

Advantageously, illustrative embodiments enable the network protocol security engine to perform validations on packets associated with TCP requests and TCP responses to thwart cyberattacks, such as DDOS attacks, on web servers, and thus prevent resources (e.g., hardware and/or software resources) of the web servers from being adversely impacted by the cyberattacks.

These and other illustrative embodiments include, without limitation, methods, apparatus, networks, systems and processor-readable storage media.

BRIEF DESCRIPTION OF THE DRAWINGS

FIG. 6 illustrates a network protocol security methodology according to an illustrative embodiment.

DETAILED DESCRIPTION

Figure 1:
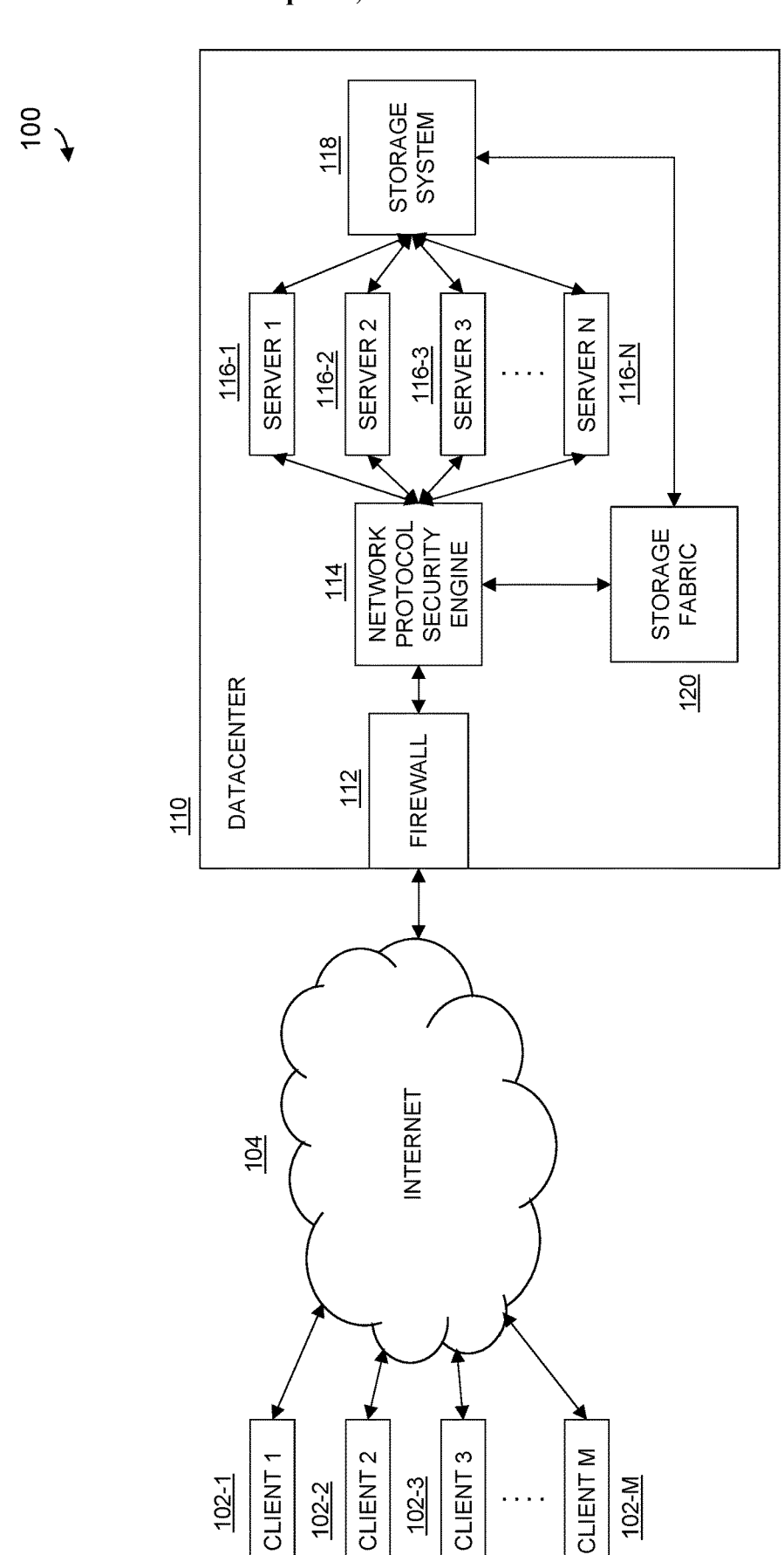
FIG. 1 illustrates an information processing system environment configured with network protocol security functionalities according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, processing systems comprising compute, storage and/or network resources, other types of processing systems comprising various combinations of physical and/or virtual resources, as well as other types of distributed computer networks.

As mentioned, cyberattacks on a networking protocol stack of a communication network, particularly on the network protocol layer comprising TCP, can cause significant disruption or failure of the communication network.

As such, it is realized herein, in accordance with illustrative embodiments, that it is desirable to scan data packets and identify probable root causes of cyberattacks such as DDOS attacks. As explained above, there is more than one way to trigger such cyberattacks. It thus becomes particularly important to be able to understand all such triggers and proactively be prepared to handle such threats.

It is further realized herein, in accordance with illustrative embodiments, that it is desirable to logically separate the TCP connection processing from the systems which are hosting services, e.g., servers hosting web services. This adds an extra layer of protection for such systems. Even in the worst-case cyberattack scenarios, the resources of the intermediate system hosting the TCP processing will be consumed as opposed to the resources of the servers hosting web services. This will help the web services maintain optimal performance at all times.

Illustrative embodiments provide a network protocol security framework which can be deployed in a datacenter (or other computing environment) and is able to monitor datacenter web services with set parameters and filter all inbound and outbound traffic. In some illustrative embodiments, by way of example only, the network protocol security framework can have the following functionalities which will be explained in further detail herein:

(i) The framework is deployable in a datacenter on a standalone machine with any operating system (OS) architecture (e.g., Windows, Linux, Custom Linux, Docker, etc.) based on OS wrapper packaging.

(ii) The framework is configured and maintained with administrator/root access levels.

(iii) The framework is configured with features of a built-in bi-directional proxy to filter all incoming and outgoing requests and responses.

(iv) The framework enables rules for different directions of the proxy to be set by a user (e.g., an administrator and/or a computer system) based on attributes such as, e.g., protocol, size, port, security level, etc. These rules can be imported to the framework during a configuration time or changed/updated later based on an input file in a format such as, e.g., a JavaScript Object Notation (JSON) format or an Extensible Markup Language (XML) format. The same JSON or XML file can later be used to configure additional instances of the framework in different datacenters (e.g., other sites and labs of a given customer).

(v) The framework can be a standalone tool working without the support of any third-party tool.

(vi) The framework comprises a TCP handler component responsible for handling all the TCP requests from different clients from the Internet.

(vii) The framework logically separates the TCP connection processing from the web services system(s), to be able to gain more control of the entire process in a much more efficient way and to decrease the load of these processes on the system which is hosting the web services.

(viii) The framework is configured to execute multiple types of validations on the TCP requests and can reject malicious requests without assigning any system resources to them.

(ix) Once configured successfully, the framework functions as a hop between a firewall and web applications running in the datacenter. This adds a robust layer of security and different malicious requests can be checked and handled. All outgoing responses are also scrutinized on the framework and logged along with a mapping with original request details.

(x) The framework filters out SYN requests with irrelevant flags (e.g., urgent (URG), push (PSH), etc.) that do not have any business logic tied to them.

(xi) The framework also masks actual web/application/DB servers (IPs/Ports etc.) and keeps them out of direct line of attack.

(xii) The framework is generic in IP protocol terms as it can be configured to work with IPv4 and IPV6 without issues. If the applications/network is ported from IPv4 to IPv6 or vice-versa then there will not be a need for re-engineering.

In accordance with illustrative embodiments, upon processing of requests by the framework, two exemplary security outcomes comprise: (a) a failure outcome when the framework identifies the TCP request as invalid (determined to be a malicious request) and rejects it; and (b) a success outcome when the framework identifies the TCP request as valid and establishes a session with the client and proceeds.

FIG. 1 illustrates an information processing system environment 100 configured with network protocol security functionalities according to an illustrative embodiment. As shown, information processing system environment 100 comprises a plurality of client devices including client device 102-1 (client 1), client device 102-2 (client 2), client device 102-3 (client 3), . . . , client device 102-M (client M). Client devices 102-1, 102-2, 102-3, . . . , 102-M may collectively be referred to hereinafter as clients 102 or individually as client 102. Clients 102 are coupled to a datacenter 110 via an Internet 104. Datacenter 110, as shown, comprises a firewall 112, a network protocol security engine 114, a plurality of servers including server 116-1 (server 1), server 116-2 (server 2), server 116-3 (server 3), . . . , server 116-N (server N). Servers 116-1, 116-2, 116-3, . . . , 116-N may collectively be referred to hereinafter as servers 116 or individually as server 116. As further shown, datacenter 110 comprises a storage system 118 and a storage fabric 120.

By way of example only, in a web services use case, it is assumed that clients 102 send web service requests to, and receive web service responses from, servers 116 via Internet 104. While firewall 112 can provide typical cybersecurity functionalities, network protocol security engine 114 is configured to provide one or more of the above-mentioned network protocol security framework functionalities, at the TCP level, and/or other functionalities. Storage system 118 and storage fabric 120 can provide typical storage functionalities for servers 116 as they process requests from and responses to clients 102.

In one or more illustrative embodiments, network protocol security engine 114 is configured to provide network protocol security functionalities in three main steps:

Step 1: Validate for any structural abnormalities; the majority of malicious or misrouted requests are supposed to have structural abnormalities, as such, network protocol security engine 114 can reject them outright to save resources of servers 116 from high utilization;

Step 2: Validate basic signs of TCP flooding; basic signs of TCP flooding can be captured by network protocol security engine 114 by recognizing the IP range patterns and ACK sequencing methodology; and Step 3: Handle TCP requests with deeper analysis; after rejecting most of the unwanted packets and TCP requests in the above two steps, network protocol security engine 114 runs other types of validations to ensure security. By way of example only, cookies, ACK sequencing, encryption, socket connections, etc. can be validated in this step.

Further details of step 1 above performed by network protocol security engine 114 (e.g., scanning data packets and validating the TCP header for structural abnormalities) may, for example, comprise: (i) verifying different flags and header fields; (ii) verifying the relevance of code bit data [SYN, ACK, FIN, PSH, RST, URG]; (iii) verifying a reserved field; (iv) verifying sizes of different fields; (v)

verifying packet data against a window size field (flow control); (vi) validating a checksum size; and (vii) providing a mechanism to filter data with an urgent flag [URG].

Further details of step 2 above performed by network protocol security engine 114 (e.g., validating TCP requests for basic signs of flooding) may, for example, comprise (i) blocking multiple SYN requests (SYN flooding) from the same IP address based on stored values in an associated database to avoid SYN flooding (sometimes the same client may send a second SYN if it fails to receive the response for first SYN, as such, a threshold value is defined to determine the occurrence of a TCP SYN flooding attack); and (ii) validating the sequence number of every ACK request by comparing it with a sequence series stored in the associated database to avert ACK flooding.

Further details of step 3 above performed by network protocol security engine 114 (e.g., deeper analysis and request processing) many, for example, comprise: (i) handling all transport layer TCP handshakes; (ii) using Secure Sockets Layer (SSL) level encryption for encrypting hash values for SYN cookies; (iii) calculating a numerical hash of incoming requests SYN and storing in the associated database; (iv) sending the encrypted value as part of SYN+ACK response (step 2 of the handshake); (v) the final ACK (step 3 of the handshake) from the client will have the encrypted value+1 in the sequence number; (vi) a hacker will never catch the response of step 2 of the handshake and this expected sequence number will not be in the ACK packets; (vii) the ACK packets with proper sequence number will only be accepted; (viii) system (server 116) resources are to be allocated to the connection socket only after there is a final ACK received from client 102 and it is validated; and (ix) updating the relevant database tables about the socket connection and starting web service operations requested from client 102.

Figure 2:
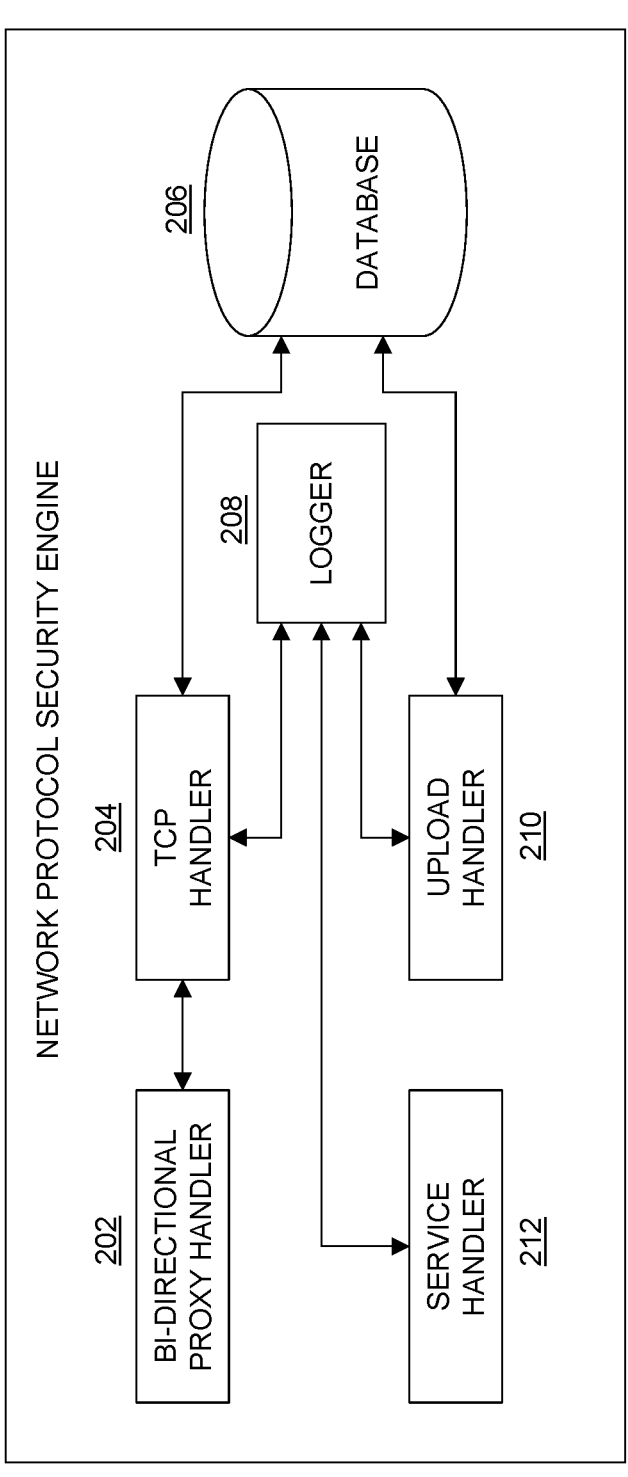
FIG. 2 illustrates an architecture for a network protocol security engine according to an illustrative embodiment.

Referring now to FIG. 2, an architecture 200 for a network protocol security engine is depicted according to an illustrative embodiment. More particularly, architecture 200 can be considered one example of a component/module architecture for network protocol security engine 114. As shown, architecture 200 comprises a bi-directional proxy handler 202, a TCP handler 204, a database 206, a logger 208, an upload handler 210, and a service handler 212.

Bi-directional proxy handler 202 performs basic functions of a proxy and filters all requests and responses coming to/from a web service (e.g., hosted by server 116).

TCP handler 204 is the core of architecture 200 (and thus of network protocol security engine 114) and is configured to validate all the incoming TCP requests and determines whether there is any risk in honoring those requests. Upon successful validation, TCP handler 204 establishes a TCP session with the requesting client (e.g., client 102) and starts taking further requests. TCP handler 204 also closes the operations based on an RST or FIN request. Further, TCP handler 204 can perform different operations such as, but not limited to, TCP sequencing, flow control, etc.

Database 206 stores all values and details related to web services, proxy rules, TCP handling mechanisms, accepted and rejected requests, etc.

Logger 208 logs all application events and processes.

Upload handler 210 performs log (from logger 208) uploads to an administrative entity (e.g., a network provider of datacenter 110) for further predictive analysis of cyber-threats.

Service handler 212 is responsible for web service start, stop, restart, etc., and monitors the web services and logs appropriate messages in logger 208.

Figure 3:
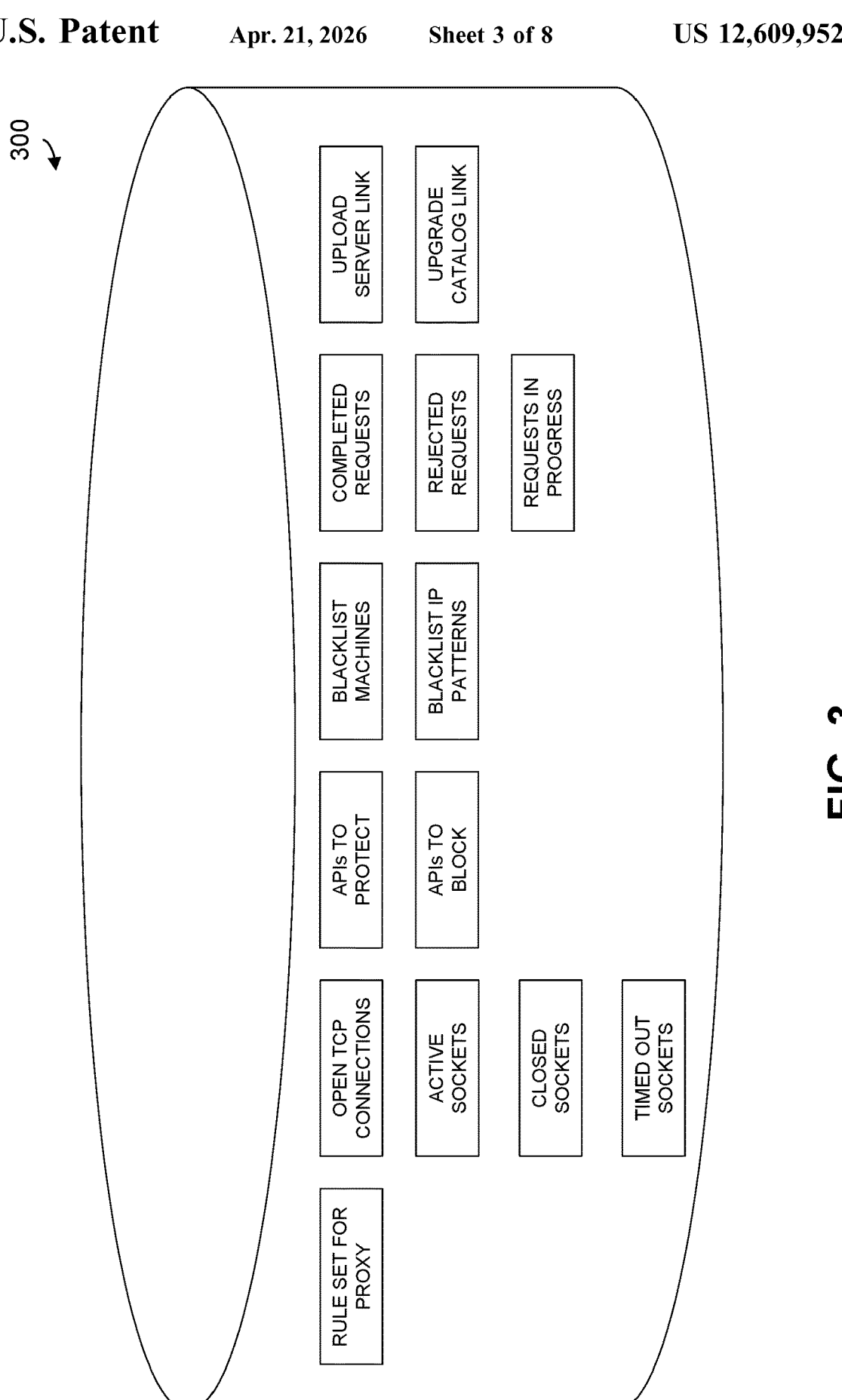
FIG. 3 illustrates database content associated with a network protocol security engine according to an illustrative embodiment.

FIG. 3 illustrates database content 300 which may be stored by database 206 of architecture 200 in FIG. 2. More particularly, database content 300, locally maintained by database 206 (in network protocol security engine 114), may comprise information such as, but not limited to: (i) details of web/application/DB services; (ii) an SSL level hashed value for every SYN request for which final ACK is awaited; (iii) details of all active socket connections; (iv) details of earlier active socket connections which are now closed with FIN or RST; (v) details of rejected SYN requests due to timeout (threats); (vi) details of backend application API completed services; (vii) a block list of malicious machines sending SYN or ACK floods; (viii) a ruleset for bi-directional proxy and communication functions and filter history; (ix) details of secure uploading to a remote server of periodic log uploads; and (x) details of a secure catalog for periodic upgrade version downloads.

Figure 4:
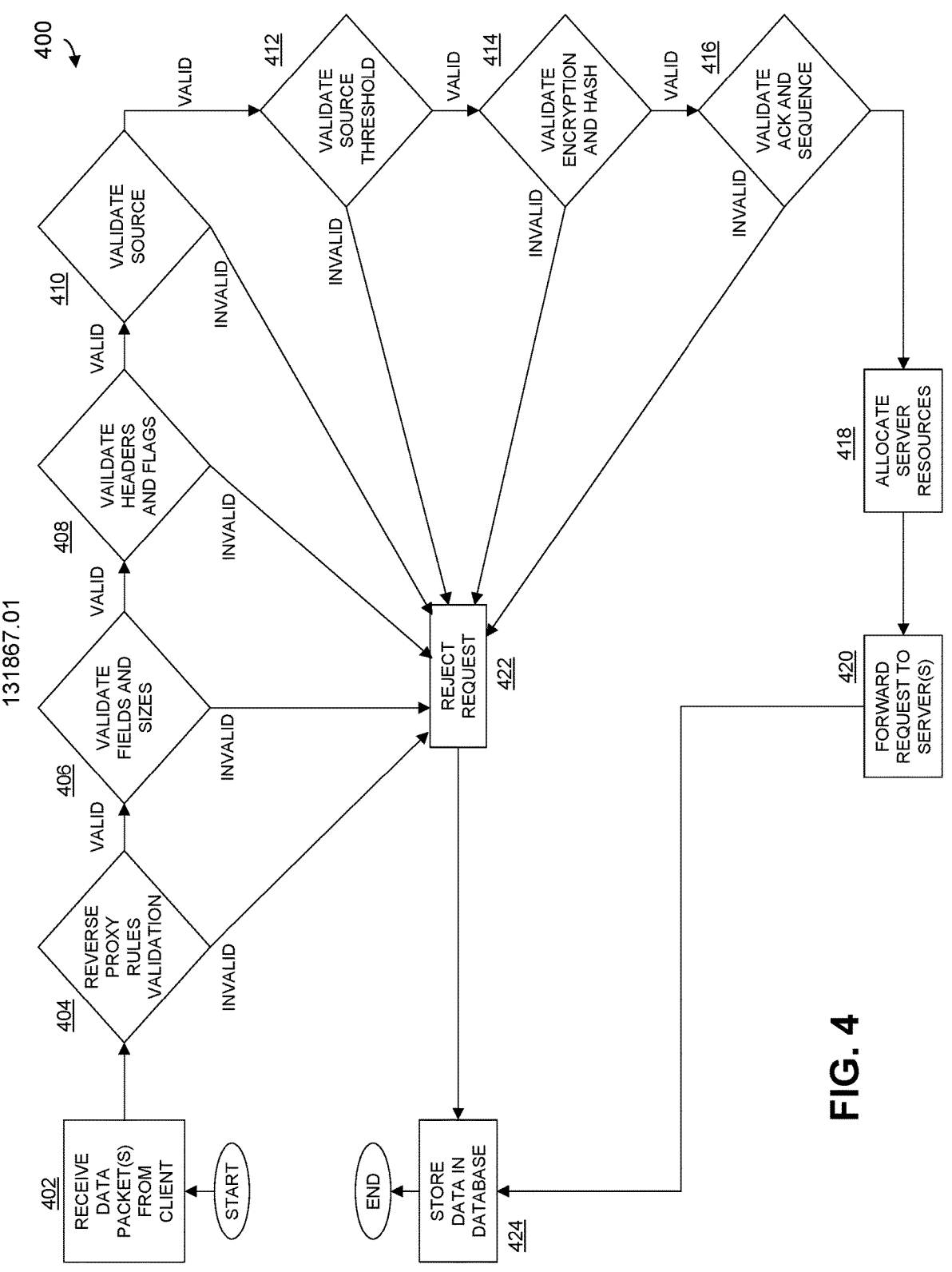
FIG. 4 illustrates a network protocol request validation process according to an illustrative embodiment.

FIG. 4 illustrates a network protocol request validation process 400 according to an illustrative embodiment. More particularly, network protocol request validation process 400 can be executed by network protocol security engine 114, e.g., via TCP handler 204 of architecture 200.

As shown, step 402 receives one or more data packets associated with a TCP request from a client (e.g., client 102 via Internet 104).

Step 404 validates reverse proxy rules (filters) applied by bi-directional proxy handler 202. In an alternative embodiment, bi-directional proxy handler 202 can perform this validation step and send the result to TCP handler 204. Since the data packets are part of a TCP request received from a client, this is typically considered the reverse proxy direction with respect to bi-directional proxy handler 202. Packets associated with responses from web servers (e.g., servers 116) are thus typically considered the forward proxy direction of the bi-directional proxy handler 202.

In response to step 404 determining that the reverse proxy rules applied are valid, step 406 validates fields and sizes of the one or more packets.

In response to step 406 determining that the packet fields and sizes are valid, step 408 validates headers and flags of the one or more packets.

In response to step 408 determining that the packet headers and flags are valid, step 410 validates the source of the one or more packets.

In response to step 410 determining that the source is valid, step 412 validates the source threshold. Recall, as illustratively explained above, a request threshold value can be defined in network protocol security engine 114 to secure against the occurrence of a TCP SYN flooding attack by a malicious source.

In response to step 412 determining that the source threshold is valid (e.g., not reached or otherwise exceeded), step 414 validates encryption and hash values associated with the one or more packets. Recall, as illustratively explained above, SSL level encryption for encrypting hash values for SYN cookies can be validated by network protocol security engine 114.

In response to step 414 determining that the encryption and hash values are valid, step 416 validates acknowledgements and sequence numbers associated with the one or more packets. Recall, as illustratively explained above, network protocol security engine 114 only validates ACK packets with proper sequence numbers.

If all the checks performed by steps 404 through 416 return a valid result, then step 418 allocates web server resources to process the TCP request, and step 420 forwards the TCP request to the appropriate web server(s).

However, if any of the checks performed by steps 404 through 416 return an invalid result, then step 422 rejects the TCP request and no web server resources are allocated and the TCP request is not sent to any web servers.

Results of the TCP request processing performed by network protocol request validation process 400 are stored in the associated database in step 424.

Figure 5:
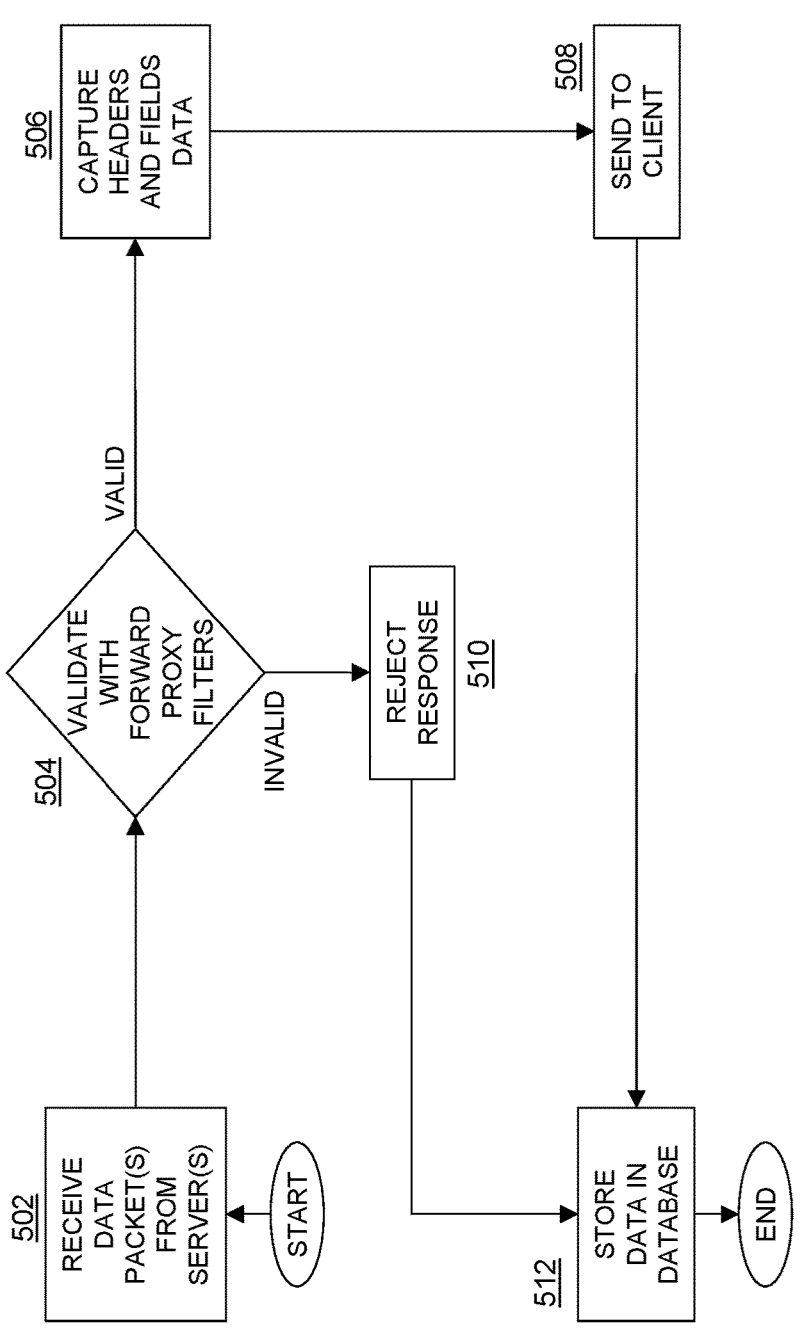
FIG. 5 illustrates a network protocol response validation process according to an illustrative embodiment.

Referring now to FIG. 5, a network protocol response validation process 500 is depicted according to an illustrative embodiment. More particularly, network protocol response validation process 500 can be executed by network protocol security engine 114, e.g., via TCP handler 204 of architecture 200.

As shown, step 502 receives one or more data packets associated with a TCP response from a web server (e.g., server 116).

Step 504 validates the TCP response with respect to forward proxy filters applied by bi-directional proxy handler 202. In an alternative embodiment, bi-directional proxy handler 202 can perform this validation step and send the result to TCP handler 204.

In response to step 504 determining that the forward proxy rules applied are valid, step 506 captures header and field data of the one or more packets, and step 508 sends the one or more packets to the requesting client.

However, if step 504 returns an invalid result, then step 510 rejects the TCP response and the TCP response is not sent to the requesting client.

Results of the TCP response processing performed by network protocol response validation process 500 are stored in the associated database in step 512.

It is to be appreciated that, in accordance with one or more illustrative embodiments, network protocol security engine 114 and the computing environment (e.g., datacenter) in which it resides can be configured by a user (e.g., an administrator and/or a computer system). Such configuration may include, but is not limited to:

(i) Installation of network protocol security engine 114 within a datacenter with administrator/root access;

(ii) Configuration of web/application/database services that network protocol security engine 114 is protecting (i.e., network protocol security engine 114 is made aware of the services and applications it is supposed to protect);

(iii) Different APIs of web/application/database services that customers will be calling upon (e.g., there may be APIs which are supposed to be used within a lab such that any calls from outside the lab should be blocked);

(iv) Input validation parameters of web requests (e.g., particular field level or API contract level validations that customers want to have performed);

(v) Limit of calls per API, if applicable (e.g., an upper limit on the number of calls per API);

(vi) Configuration of customer's reporting console, if applicable (e.g., network protocol security engine 114 can be plugged into a customer's reporting console in a straightforward manner);

(vii) Periodic clean up schedule for database/logs, etc. (e.g., network protocol security engine 114 can have a default cleanup schedule; however, to prevent the database or logs size from exceeding disk usage, users can configure their own expected rules); and (viii) Ruleset for bi-directional proxy handler (e.g., different inbound and outbound filters related to the bi-directional proxy along with block list and non-block list configurations).

Advantageously, illustrative embodiments provide a robust, self-learning, lightweight and proactive network protocol security framework that prevents cyberattacks, such as DDOS attacks, on a customer datacenter. The network protocol security framework monitors all network traffic coming towards the datacenter and based on its set principles and rules, it ensures that the data packets are properly structured and do not have any signs of flooding. With deeper analysis, the network protocol security framework ensures that proper handshake, sequencing, and system (server) resource allocation occurs. The network protocol security framework can be strategically placed in a datacenter as a first line of defense against DDOS threats.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

FIG. 6 illustrates a network protocol security methodology 600 according to an illustrative embodiment. As shown in FIG. 6, network protocol security methodology 600 comprises step 602 which configures a network protocol security engine to separately reside between a set of one or more first computing devices (e.g., clients 102) making one or more service requests (e.g., TCP requests) and a set of one or more second computing devices (e.g., servers 116 configured to provide web services) responding (e.g., with TCP responses) to the one or more service requests.

Step 604 obtains, at the network protocol security engine, at least one packet, wherein the at least one packet is associated with a network protocol layer request received from one of the set of one or more first computing devices, or associated with a network protocol layer response from one of the set of one or more second computing devices.

Step 606 performs, at the network protocol security engine, one or more validations on one or more attributes of the at least one packet.

Step 608, at the network protocol security engine, accepts the request or the response, or rejects the request or the response, based on results of the one or more validations on the one or more attributes of the at least one packet.

When a request is accepted, the network protocol security engine can then allocate server resources and forward the request to the servers for processing. When a response is accepted, the network protocol security engine can forward the response to the requesting client.

Illustrative embodiments of processing platforms utilized to implement functionality for application program management using an application assistant will now be described in greater detail with reference to FIGS. 7 and 8. Although described in the context of information processing system environments mentioned herein, these platforms may also be used to implement at least portions of other information processing systems in other embodiments.

Figure 7:
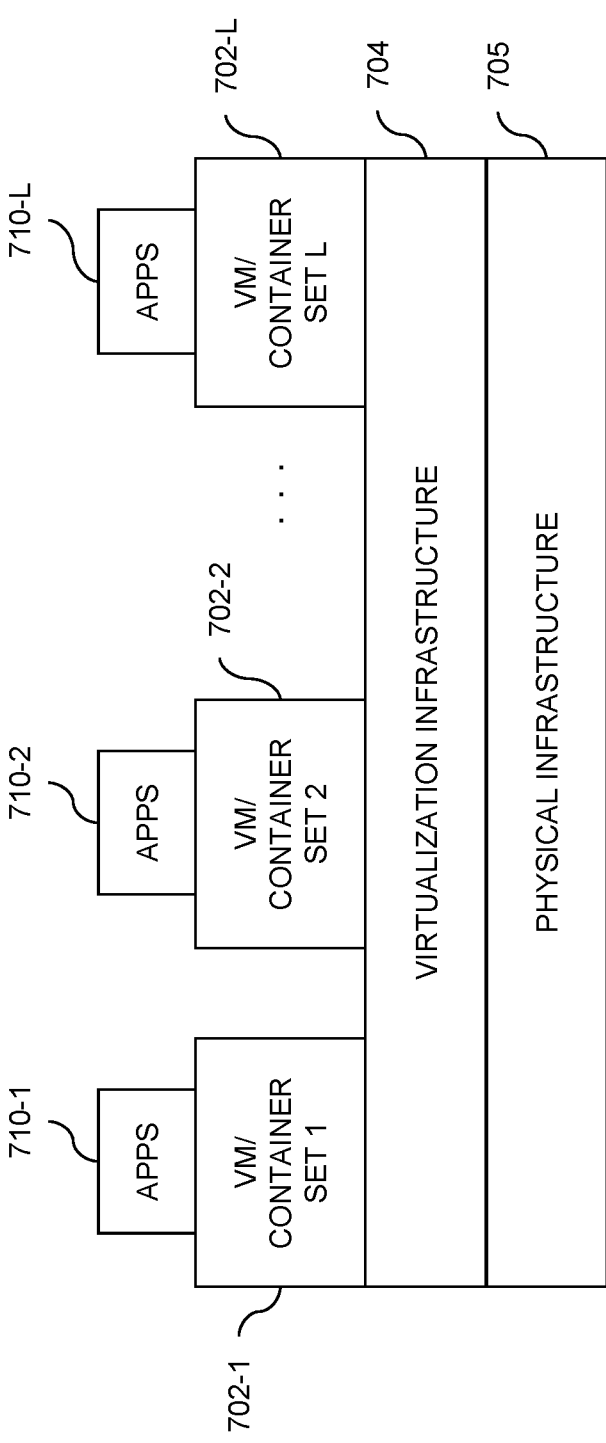
FIGS. 7 and 8 illustrate examples of processing platforms that may be utilized to implement at least a portion of an information processing system in illustrative embodiments.
Figure 8:
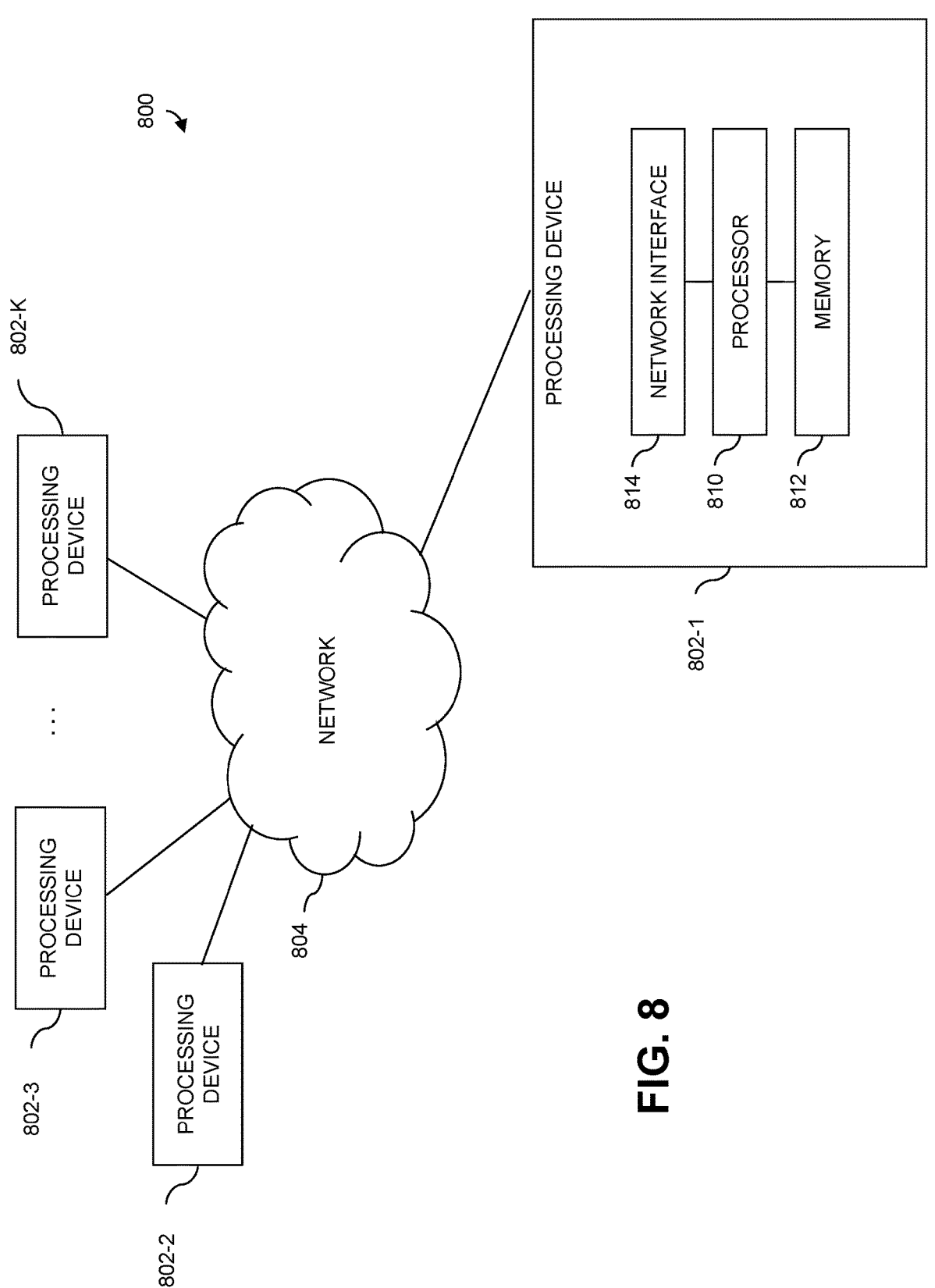

FIG. 7 shows an example processing platform comprising infrastructure 700.

Infrastructure 700 comprises a combination of physical and virtual processing resources that may be utilized to implement at least a portion of the information processing system environment 100 in FIG. 1. Infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

Infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environments mentioned herein may each run on a computer, server, storage device or other processing platform element. A given such element may be viewed as an example of what is more generally referred to herein as a "processing device." Infrastructure 700 shown in FIG. 7 may represent at least a portion of one processing platform. Another example of such a processing platform is processing platform 800 shown in FIG. 8.

The processing platform 800 in this embodiment comprises at least a portion of information processing system environment 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system environments mentioned herein may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, wherein the at least one processing platform is configured to operate as a proxy between one or more first computing devices making one or more service requests and one or more second computing devices responding to the one or more service requests, and wherein the at least one processing platform is further configured to:

filter incoming network protocol layer requests from the one or more first computing devices to the one or more second computing devices; and filter outbound network protocol layer responses from the one or more second computing devices to the one or more first computing devices;

wherein in filtering the incoming network protocol layer requests, the at least one processing platform is configured to:

obtain at least one packet associated with a network protocol layer request received from a given one of the one or more first computing devices;

perform one or more validations on one or more attributes of the at least one packet associated with the network protocol layer request; and accept or reject the network protocol layer request based on results of the one or more validations on the one or more attributes of the at least one packet associated with the network protocol layer request; and wherein in filtering the outbound network protocol layer responses, the at least one processing platform is configured to:

obtain at least one packet associated with a network protocol layer response from a given one of the one or more second computing devices;

perform one or more validations on one or more attributes of the at least one packet associated with the network protocol layer response; and accept or reject the network protocol layer response based on results of the one or more validations on the one or more attributes of the at least one packet associated with the network protocol layer response.

2. The apparatus of claim 1, wherein the network protocol layer request and the network protocol layer response are associated with a transport layer of a networking protocol stack.

3. The apparatus of claim 1, wherein the network protocol layer request and the network protocol layer response are associated with a transmission control protocol (TCP).

4. The apparatus of claim 1, wherein the one or more first computing devices comprise one or more client devices, and the one or more second computing devices comprise one or more servers.

5. The apparatus of claim 4, wherein the one or more servers are part of a computing environment wherein the at least one processing platform is configured to reside within the computing environment and the one or more first computing devices reside outside the computing environment.

6. The apparatus of claim 5, wherein the computing environment comprises a datacenter.

7. The apparatus of claim 1, wherein the one or more validations performed on the one or more attributes of the at least one packet associated with the network protocol layer request or the network protocol layer response comprise checking the at least one packet for one or more structural abnormalities.

8. The apparatus of claim 7, wherein checking the at least one packet for one or more structural abnormalities further comprises verifying one or more of a code bit, a header, a field, a flag, and a size associated with the at least one packet.

9. The apparatus of claim 1, wherein the one or more validations performed on the one or more attributes of the at least one packet associated with the network protocol layer request or the network protocol layer response comprise checking the at least one packet for characteristics of a flooding attack.

10. The apparatus of claim 9, wherein checking the at least one packet for characteristics of a flooding attack further comprises checking a number of synchronize requests received from the given one of the one or more first computing devices that sent the network protocol layer request.

11. The apparatus of claim 9, wherein checking the at least one packet for characteristics of a flooding attack further comprises validating a sequence number of an acknowledge request received from the given one of the one or more first computing devices that sent the network protocol layer request.

12. The apparatus of claim 1, wherein the one or more validations performed on the one or more attributes of the at least one packet associated with the network protocol layer request or the network protocol layer response comprise analyzing one or more encryption characteristics associated with the at least one packet.

13. The apparatus of claim 1, wherein the one or more validations performed on the one or more attributes of the at least one packet associated with the network protocol layer request or the network protocol layer response comprise analyzing one or more socket connection characteristics associated with the at least one packet.

14. The apparatus of claim 1, wherein the one or more validations performed on the one or more attributes of the at least one packet associated with the network protocol layer request or the network protocol layer response comprise analyzing one or more handshake characteristics associated with the at least one packet.

15. The apparatus of claim 1, wherein the at least one processing platform is further configured to allocate resources associated with at least one of the one or more second computing devices to enable the at least one of the one or more second computing devices to respond to an accepted request.

16. The apparatus of claim 1, wherein the one or more validations performed on the one or more attributes of the at least one packet associated with the network protocol layer request or the network protocol layer response comprise validating one or more bi-directional proxy filters.

17. A method comprising:

configuring a network protocol security engine to operate as a proxy between one or more first computing devices making one or more service requests and one or more second computing devices responding to the one or more service requests;

filtering, by the network protocol security engine, incoming network protocol layer requests from the one or more first computing devices to the one or more second computing devices; and filtering, by the network protocol security engine, outbound network protocol layer responses from the one or more second computing devices to the one or more first computing devices;

wherein filtering the incoming network protocol layer requests comprises:

obtaining, by the network protocol security engine, at least one packet associated with a network protocol layer request received from a given one of the one or more first computing devices;

performing, by the network protocol security engine, one or more validations on one or more attributes of the at least one packet associated with the network protocol layer request; and accepting or rejecting, by the network protocol security engine, the network protocol layer request based on results of the one or more validations on the one or more attributes of the at least one packet associated with the network protocol layer request; and wherein filtering the outbound network protocol layer responses comprises:

obtaining, by the network protocol security engine, at least one packet associated with a network protocol layer response from a given one of the one or more second computing devices;

performing, by the network protocol security engine, one or more validations on one or more attributes of the at least one packet associated with the network protocol layer response; and accepting or rejecting, by the network protocol security engine, the network protocol layer response based on results of the one or more validations on the one or more attributes of the at least one packet associated with the network protocol layer response;

wherein the steps are performed in accordance with a processing device comprising a processor operatively coupled to a memory and configured to execute program code.

18. The method of claim 17, further comprising, the network protocol security engine allocating resources associated with at least one of the one or more second computing devices to enable the at least one of the one or more second computing devices to respond to an accepted request.

19. The method of claim 17, wherein the network protocol layer request and the network protocol layer response are associated with a transmission control protocol (TCP), the one or more first computing devices comprise one or more client devices and the one or more second computing devices comprise one or more servers, and the one or more servers are part of a computing environment wherein the network protocol security engine is configured to reside within the computing environment and the one or more first computing devices reside outside the computing environment.

20. A computer program product comprising a non-transitory processor-readable storage medium having stored therein program code of one or more software programs, wherein the program code when executed by at least one processing device causes the at least one processing device to:

instantiate a network protocol security engine to operate as a proxy between one or more first computing devices making one or more service requests and one or more second computing devices responding to the one or more service requests, wherein the network protocol security engine is configured to:

filter incoming network protocol layer requests from the one or more first computing devices to the one or more second computing devices; and filter outbound network protocol layer responses from the one or more second computing devices to the one or more first computing devices;

wherein in filtering the incoming network protocol layer requests, the network protocol security engine is configured to:

obtain at least one packet associated with a network protocol layer request received from a given one of the one or more first computing devices;

perform one or more validations on one or more attributes of the at least one packet associated with the network protocol layer request; and accept or reject the network protocol layer request based on results of the one or more validations on the one or more attributes of the at least one packet associated with the network protocol layer request; and wherein in filtering the outbound network protocol layer responses, the network protocol security engine is configured to:

obtain at least one packet associated with a network protocol layer response from a given one of the one or more second computing devices;

perform one or more validations on one or more attributes of the at least one packet associated with the network protocol layer response; and accept or reject the network protocol layer response based on results of the one or more validations on the one or more attributes of the at least one packet associated with the network protocol layer response.

* * * * *